United States Patent [19]

Torra

[11] Patent Number: 4,998,674

[45] Date of Patent: Mar. 12, 1991

[54] FLUENT GRANULAR MATERIAL DISPENSER AND APPLICATOR

[76] Inventor: Alessandro Torra, 26 Bixby St., Revere, Mass. 02151

[21] Appl. No.: 581,112

[22] Filed: Feb. 16, 1984

[51] Int. Cl.$^5$ ............................................. A01C 7/02
[52] U.S. Cl. ................................... 239/652; 239/689; 239/377; 239/553.5
[58] Field of Search .................. 239/652, 689, 377; 222/460, 461, 462; 220/94 A; 215/1 C

[56] References Cited

U.S. PATENT DOCUMENTS

| | | | |
|---|---|---|---|
| 125,324 | 4/1872 | Paine | 239/652 |
| 1,274,969 | 8/1918 | Wirt | 239/652 |
| 1,793,197 | 2/1931 | Speicher | 239/652 |
| 3,074,727 | 1/1963 | Sosalla et al. | 239/689 X |
| 3,140,887 | 7/1964 | Wallace et al. | 291/1 |
| 3,177,908 | 4/1965 | Kaufman | 222/460 X |
| 3,206,083 | 9/1965 | Nishina | 222/460 |
| 3,997,119 | 12/1976 | Oosterhof | 239/652 |
| 4,269,722 | 5/1981 | Joshi et al. | 215/1 C X |

FOREIGN PATENT DOCUMENTS

| | | | |
|---|---|---|---|
| 576978 | 1/1957 | Italy | 220/94 A |
| 1024763 | 4/1966 | United Kingdom | 220/94 A |

*Primary Examiner*—Steven A. Bratlie
*Attorney, Agent, or Firm*—Fleit, Jacobson, Cohn, Price, Holman & Stern

[57] ABSTRACT

A hollow, hand-supportable and invertible housing is provided including a closed bottom and upstanding peripheral walls terminating upwardly in a hollow upwardly opening neck. An elongated spreading and dispensing nozzle is provided and the nozzle includes a first hollow and generally cylindrical inlet end removably telescopically engaged with the neck of the housing and an outlet end which is generally rectangular in cross section. Longitudinal walls extend between and connect the inlet and outlet ends of the nozzle and the longitudinal walls gradually flare and taper, respectively, toward the ends and sides of the rectangular outlet neck of the nozzle from the inlet end thereof. The nozzle includes internal laterally spaced transversely projecting partitions and the outlet end of the nozzle is provided with a removable closed-ended channel-shaped cover removably snap-fittingly engaged thereover. Further, the housing includes structure defining a transverse through opening intermediate the closed and neck ends of the housing, sealed relative to the interior of the housing and defining a handgrip by which the housing may be comfortably gripped, lifted and inverted.

4 Claims, 1 Drawing Sheet

FLUENT GRANULAR MATERIAL DISPENSER AND APPLICATOR

BACKGROUND OF THE INVENTION

There are various different situations in which a slippery road surface decreases tire traction to the extent that movement of a passenger vehicle may not be initiated by traction of the drive wheels thereof. In order to increase traction at least during starting movement of the vehicle it is customary to spread sand, rock salt or other granular materials such as "kitty litter" in front of the driving wheels of the vehicle. In most instances sufficient initial traction to enable forward movement of the vehicle to be started is sufficient to allow continued vehicle movement over an icy road surface.

Accordingly, many vehicle drivers will store a supply of sand, rock salt or "kitty litter" within a storage area of their vehicle together with a shovel or other implement whereby the stored traction-increasing granular material may be spread in front of the drive wheels of the vehicle in order to at least enable initial forward movement of the vehicle over icy road surfaces. However, such stored granular materials are often spilled either during storage or while attempting to shovel quantities thereof from the storage area for placement in front of the driving wheels of an associated vehicle. Accordingly, a need exists for structure by which tire traction-increasing granular material may be stored within a vehicle and subsequently, when needed, spread in front of the driving wheels of the vehicle, independent of spilling of the granular material.

Various different forms of granular material containers and disPensers including some of the general structural and operational features of the instant invention heretofore have been provided such as those disclosed in U.S. Pat. Nos. 125,324, 1,274,969, 1,793,197 and 3,140,887. However, these previously known forms of granular material containers and dispensers do not include some of the specific features of the instant invention which particularly well adapt it for use in storing and spreading traction-increasing granular material in front of the driving wheels of an associated vehicle.

BRIEF DESCRIPTION OF THE INVENTION

The dispenser and applicator of the instant invention includes a bottle-shaped housing constructed of plastic material and including an upper end outlet neck with which a dispensing nozzle of the gravity feed type is removably attached. The nozzle includes an outlet end which is rectangular in cross-sectional shape and of a length several times its width. The outlet end of the nozzle includes internal partitions defining individual outlet openings spaced there along and the housing may contain granular vehicle wheel traction assisting materials such as sand, rock salt or "kitty litter". Further, the housing includes a through opening therein sealed from the interior of the housing and defining a handgrip by which the housing may be readily manually gripped, lifted and inverted for the purpose of spreading granular material beneath and in front of the driving wheels of a vehicle.

The main object of this invention is to provide a storage container and applicator for vehicle driving wheel traction assisting granular materials and which may be quickly used to spread traction assisting granular materials beneath and forward of the driving wheels of a vehicle.

Another object of this invention is to provide a container and dispenser for granular materials in accordance with the preceding object and constructed of a size and shape enabling ready storage within an associated Passenger vehicle.

Another important object of this invention is to provide an apparatus which will be capable of storing vehicle wheel traction assisting granular materials against the absorption of moisture from the ambient air.

Another very important object of this invention is to provide a container and applicator for granular materials constructed in a manner whereby even dispensing and spreading of granular materials therefrom beneath and in front of the driving wheels of a vehicle may be readily accomplished.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
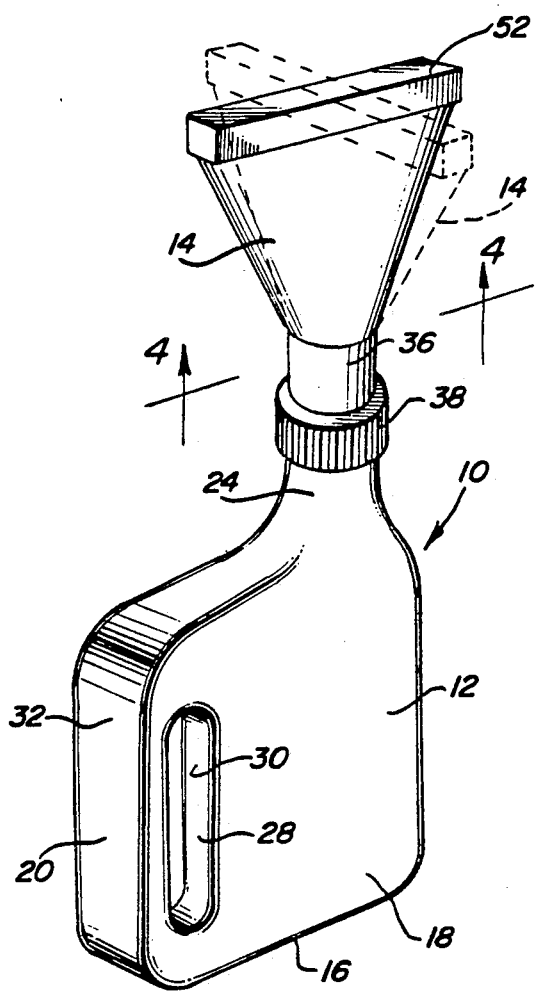
FIG. 1 is a perspective view of the combined housing and dispenser of the instant invention.
Figure 3:
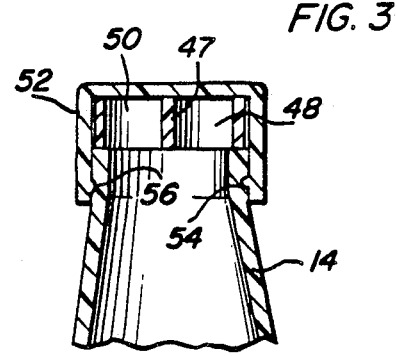
FIG. 3 is a fragmentary enlarged transverse vertical sectional view taken substantially upon the plane indicated by the section line 3—3 of FIG. 2.

Referring now more specifically to the drawings the numeral 10 generally designates the combined container and dispenser of the instant invention incorporating a bottle-shaped housing 12 and a dispensing nozzle 14.

The housing 12 is vertically elongated and generally rectangular in plan shape and includes a bottom wall 16, opposite side walls 18 and opposite end walls 20 and 22. The walls 18, 20 and 22 are substantially vertically straight throughout their major height portions, but the upper end of the housing 12 merges into a hollow cylindrical neck 24 through which granular material 26 may be admitted into the housing 12 and also dispensed therefrom. The housing 12 includes a transverse opening 28 extending transversely therethrough and opening outwardly through the side walls 18. The opening 28 is sealed relative to the interior of the housing 12 by a connecting wall 30 extending between the side walls 18 and about the periphery of the opening 28. The opening 28 defines a handgrip 32 by which the housing may be readily grasped by one hand, lifted and inverted. Further, the handgrip 32 is defined adjacent the end wall 20 while one side 34 of the neck 24 defines a substantial coextensive extension of the end wall 22. Therefore, the handgrip 32 is disposed at one end of the housing 12 while the neck 24 is disposed adjacent the opposite end of the housing 24, for a purpose to be hereinafter more fully set forth.

The nozzle 14 includes an inlet end 36 including an integral female coupling 38 telescoped over and releasably secured to the free end of the neck 24. The coupling 38 includes internal lugs 40 which coact with external grooves 42 formed in the neck 24. The lugs 40 and grooves 42 define a camlock connection between the coupling 38 and the neck 24. The coupling includes two pairs of diametrically opposite lugs 40 and the neck 24 includes two pairs of diametrically opposite grooves 42, whereby the nozzle may be positioned in either of the solid and phantom line positions thereof illustrated in FIG. 1.

Figure 2:
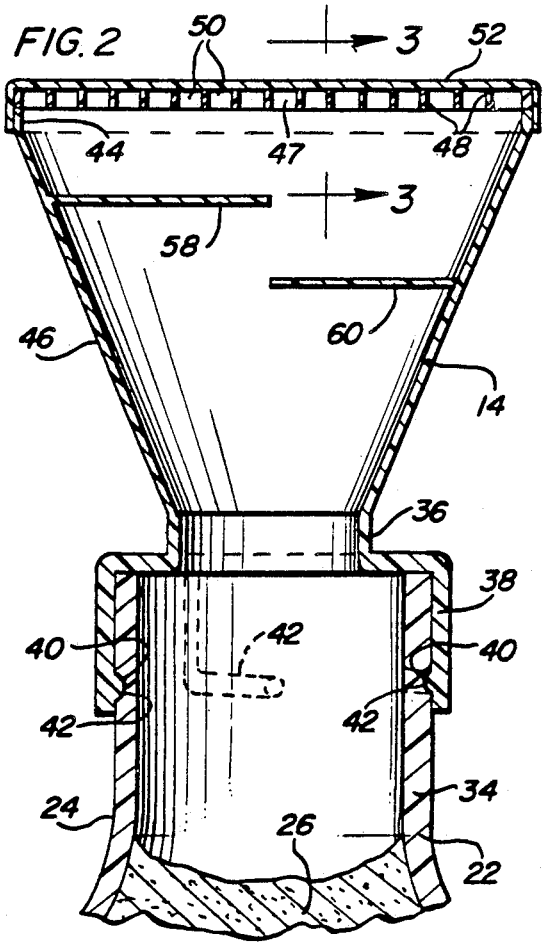
FIG. 2 is an enlarged fragmentary vertical sectional view of the upper outlet neck portion of the container and the dispensing and spreading nozzle supported therefrom.
Figure 4:
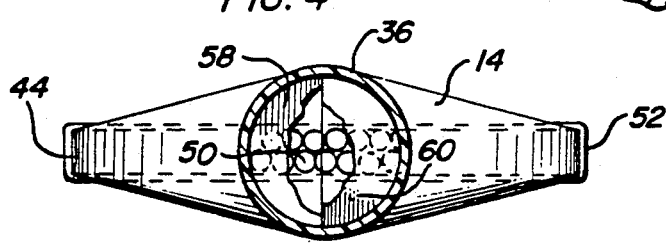
FIG. 4 is an enlarged horizontal sectional view taken substantially upon the plane indicated by the section line 4—4 of FIG. 1.

The nozzle 14 includes an outlet end 44 which is rectangular in cross-sectional shape and substantially centered relative to the longitudinal center axis of the cylindrical neck 24. The nozzle 14 includes longitudinal walls 46 which taper toward the opposite longitudinal sides of the outlet end 44 and diverge toward the opposite ends of the outlet end 44. In addition, the outlet end 44 includes an internal center longitudinal partition 47 as well as laterally spaced transversely extending transverse partitions 48 which divide the interior of the outlet end 44 into a plurality of rows of individual outlet openings 50. A closed-ended channel-shaped cover 52 is provided and removably snap-fittingly engaged over the outlet end 44 to close the latter in substantially fluid-tight sealed engagement therewith. The cover 52 includes peripherally extending ribs 54 which are snap-fittingly engaged in a peripherally extending groove 56 formed about the exterior of the outlet end 44. Also, from FIG. 2 of the drawings, it may be noted that the interior of the nozzle 14 includes longitudinally spaced transversely extending baffles 58 and 60 which project inwardly in opposite directions from remote longitudinal walls 46 of the nozzle 14. The partitions 58 and 60 serve to break up any clumps of granular material which may be dispensed from the neck 24 into the nozzle 14.

The housing 12 and nozzle 14 may each be constructed of suitable plastic material and the cover or cap 52 may also be constructed of plastic material. In operation, the granular material 26 is stored within the housing 12 while the cap or closure 52 is tightly engaged over the outlet end 44 of the nozzle 14 in order to prevent the entrance of moisture into the interior of the housing 12 and thereby pervent freezing or lumps forming of the granular material 26. The housing and nozzle may be stored in a suitable out-of-the-way place within a passenger vehicle or the like. Then, when it is desired to dispense and spread traction increasing granular material from the housing 12 beneath and in front of the drive wheels of a vehicle, the dispenser 10 may be removed from its storage place and the closure or cap 52 may be removed. Thereafter, the housing 12 may be gripped by the handgrip 32 and manipulated to dispense granular material 26 from the dispenser 10 through the nozzle 14 thereof onto the road surface beneath and in front of the drive wheels of a vehicle.

The positioning of the handgrip 32 at one end of the housing 12 and the nozzle 14 being supported from the other end of the housing 12 facilitates proper positioning of the nozzle immediately in front of the lower periphery of the driving wheel of a vehicle by a person disposed on that side of the vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A dispenser for dispensing and spreading granular fluent material, said dispenser including a hollow, hand-supportable and invertible housing having a closed bottom and upstanding peripheral walls terminating upwardly in a hollow upwardly opening outlet neck, an elongated spreading and dispensing nozzle, said nozzle including a first hollow and generally cylindrical inlet end removably telescopingly engaged with said outlet neck for receiving granular material therefrom when said dispenser and nozzle are inverted and a second outlet end remote from said first end, said outlet end being generally rectangular in cross section and said nozzle including longitudinal sidewalls which taper toward the opposite longitudinal sides of said outlet end and diverge toward the opposite ends of said rectangular outlet end, said outlet end of said nozzle including internal laterally spaced transverse wall portions defining a plurality of individual outlet openings therebetween, said housing including means defining a transverse through opening therein relative to which the interior of said housing is sealed and defining a handgrip by which said housing may be comfortably gripped, lifted and inverted, said housing being generally rectangular in horizontal plane and including opposite wide and narrow sidewalls comprising said peripheral walls, said handgrip being disposed along one of said narrow sidewalls, said outlet neck extending outwardly from one end of the other narrow sidewall of said housing, the inlet end of said nozzle and said neck including mounting means operative to selectively support said nozzle from said neck in 90° relatively rotated positions thereon with the longitudinal extend of said nozzle outlet end disposed transverse to and paralleling the major transverse dimension of said housing.

2. The dispenser of claim 1 wherein said neck and inlet end of said nozzle include removably engaged twist lock lugs and grooves mounting said nozzle upon said neck comprising said mounting means.

3. The dispenser of claim 1 wherein said nozzle, intermediate said inlet and outlet ends, includes laterally spaced and oppositely directed transverse partial partitions projecting inwardly from opposite longitudinal walls thereof.

4. The dispenser of claim 3 including a closed-ended and channel-shaped cover removably snap-fittingly telescoped over said outlet end.

* * * * *